Patented May 6, 1930

1,757,646

UNITED STATES PATENT OFFICE

HERBERT E. MORTLAND, OF GLENDALE, MISSOURI, ASSIGNOR TO PEVELY DAIRY COMPANY, OF ST. LOUIS, MISSOURI, A CORPORATION OF MISSOURI

PROCESS OF TREATING MILK

No Drawing.   Application filed February 6, 1928.   Serial No. 252,427.

This invention relates to improvements in a process for treatment of milk.

An object of the invention is to provide a method of treatment for milk, preferably after the cream has been removed, for producing an evaporated milk having the normal characteristics thereof so modified as to produce a filler or body for ice cream and other confections.

Additional advantages of the process will be apparent from the following description thereof illustrating a procedure within the limits of novelty of the invention.

The method of procedure includes the treatment of a quantity of milk, preferably cows' milk, with the cream removed, and generally referred to in the art as skimmed milk. The process is one known as a batch process, that is to say, a definite quantity of the milk is carried through the operation to produce the final product and within certain approximate limits the added ingredients and the time of treatment are controlled in respect of the base quantity of the milk. For example, the process will be assumed to be conducted upon the basis of a thousand pounds of milk to the batch. The batch of skimmed milk is brought to an approximate temperature of 145 degrees Fahrenheit in a hot well, and to the batch, after having attained this temperature, there is added a modified alkali which consists of a mixture for the batch quantity of approximately thirty-five pounds of cane sugar, seven pounds of lime and fifty pounds of water. These ingredients are mixed cold and then introduced gradually into the heated batch of milk.

The result of the addition of the modified alkali is to partially neutralize the acidity of the milk and to change its chemical and physical characteristics preparatory to the next step of the process which comprises the thermal treatment of the batch while held under a partial vacuum. This step is carried out in a vacuum pan in which the vacuum may be controlled and in which the ingredients are held at an approximate temperature of 145 degrees Fahrenheit for a period of about ninety minutes. This, in ordinary practice, results in the reduction of the fluidity of the mixture until the specific gravity reaches approximately seventeen and three-fourths Baumé. That is to say, the fluidity is reduced aproximately five to one.

This treatment under vacuum results in the swelling of the casein particles, a substantial dehydration of the mixture and a complete agitation and mixture of the fats and albuminoids forming a homogeneous mass of a semi-solid constituency.

This product can be used as a filler for ice cream or for other confections to produce a final product and one that is free from deleterious ingredients and which will have a substantial body when whipped, either in the process of freezing the ice cream, or in the mechanical whipping in other confection products. When used as a filler for ice cream it is mixed in the proportion of approximately one part of the filler to two and one-fourth parts, by weight, of cream. The final ice cream product has an extremely smooth body retaining a substantial consistency over a considerable period of time when exposed to a temperature above freezing point.

I am aware that the exact procedure specifically described is not essential to the practice of the process but what I claim and desire to secure by Letters Patent is:

1. The process of treating milk which consists in adding to a heated quantity thereof a quantity of alkali, and then treating the mixture under a partial vacuum to reduce the fluidity thereof to produce a homogeneous mass of semi-solid constituency and which is approximately neutral.

2. The process of treating milk which consists in raising the temperature thereof to approximately 145 degrees Fahrenheit, adding thereto in the cooled state a sugar syrup having an alkali ingredient, said syrup being added while cold, and then maintaining the mixture at an approximate temperature of 145 degrees Fahrenheit to reduce the specific gravity thereof to approximately seventeen and three-fourths Baumé.

3. The process of treating milk which consists in making a mixture of skimmed milk with a sugar syrup including an alkali ingredient, the portions of the several ingredients being approximately in accordance with the following formula; milk one thousand pounds; sugar thirty-five pounds; lime seven pounds; and water fifty pounds; and then subjecting the mixture to heat to reduce the fluidity thereof.

4. The process of treating milk which consists in making a mixture of skimmed milk with a sugar syrup including an alkali ingredient, the portions of the several ingredients being approximately in accordance with the following formula; milk one thousand pounds; sugar thirty-five pounds; lime seven pounds; and water fifty pounds; and then subjecting the mixture to heat to reduce the fluidity thereof to approximately a specific gravity of seventeen and three-fourths Baumé.

5. The process of treating milk which consists in adding to a quantity of skimmed milk an alkali to substantially neutralize the acidity of the milk, and then subjecting the mixture to a thermal and agitating action in a vacuum pan to run down the fluidity of the milk and to thoroughly mix the remaining components thereof.

HERBERT E. MORTLAND.